United States Patent [19]

Uetsuki et al.

[11] Patent Number: 4,588,141
[45] Date of Patent: May 13, 1986

[54] HANDLE FOR A FISHING SPINNING REEL

[75] Inventors: Haruo Uetsuki; Toshiaki Yorikane, both of Hiroshima, Japan

[73] Assignee: Ryobi Ltd., Hiroshima, Japan

[21] Appl. No.: 720,043

[22] Filed: Apr. 3, 1985

Related U.S. Application Data

[63] Continuation of Ser. No. 473,916, Mar. 10, 1983, abandoned.

[30] Foreign Application Priority Data

Mar. 15, 1982 [JP] Japan ............................ 57-36622[U]

[51] Int. Cl.$^4$ ........................ A01K 89/00; G05G 1/10
[52] U.S. Cl. .................. 242/84.1 J; 74/547; 242/96
[58] Field of Search ............... 242/84.1 J, 96, 84.8; 74/547, 546, 545

[56] References Cited

U.S. PATENT DOCUMENTS 3,948,117  4/1976  Kimura ..................... 242/84.1 J X
4,253,618  3/1981  Beraut ...................... 242/84.1 J
4,310,127  1/1982  Yamasaki ................... 242/96 X
4,437,621  3/1984  Sakumoto .................. 242/84.1 J

*Primary Examiner*—Stuart S. Levy
*Assistant Examiner*—Joseph J. Hail, III
*Attorney, Agent, or Firm*—Sughrue, Mion, Zinn, Macpeak, and Seas

[57] ABSTRACT

A handle assembly for a spinning reel for fishing includes a handle shaft connected to a reel body and having an end projection, and a handle arm connected to the handle shaft. The handle arm is provided with a channel-shaped groove in which the projection of the handle shaft is received. The arm is pivotally connected to the shaft projection, and rotatable between a first position in which it is coaxial with the shaft and a second position in which it is perpendicular to the shaft. The arm is also provided with a recess contiguous to the groove. A slider is slidable in the recess. A spring is disposed in the recess for urging the slider into locking engagement with one side of the shaft projection when the arm is in its first position.

2 Claims, 4 Drawing Figures

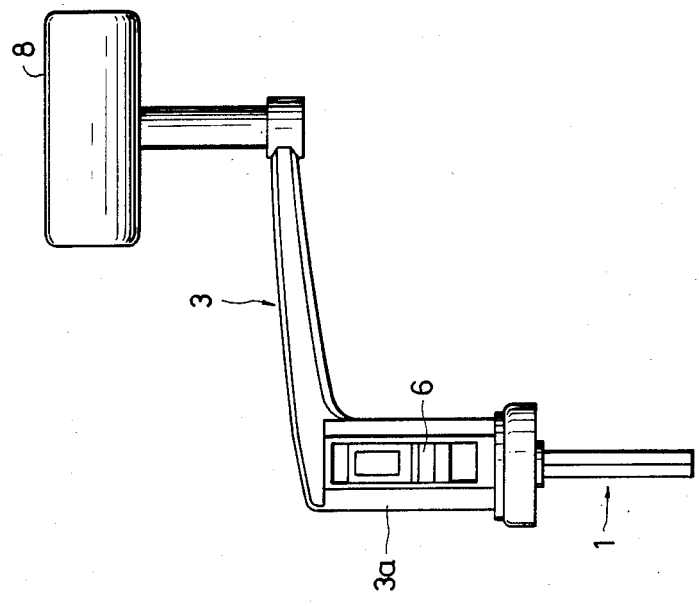
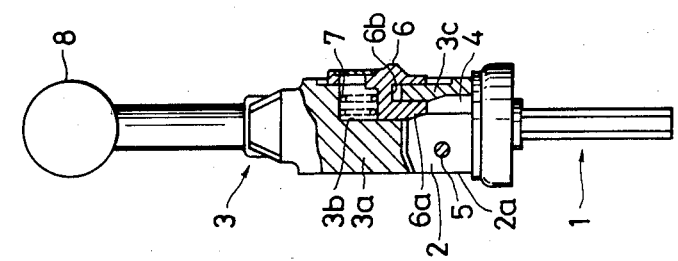

HANDLE FOR A FISHING SPINNING REEL

This application is a continuation of Ser. No. 473,916 filed on Mar. 10, 1983 now abandoned.

BACKGROUND OF THE INVENTION

1. Field of the Invention

This invention relates to a foldable handle for a spinning reel for fishing.

2. Description of the Prior Art

A spinning reel for fishing usually has a handle which extends outwardly so that it may not abut against a rotor or spool having a relatively large diameter. The handle is, therefore, foldable for storage or transportation. The handle is, however, secured to a handle shaft by a screw, and this screw is loosened or tightened to fold or unfold the handle. Therefore, the folding or unfolding operation cannot be performed quickly. Moreover, when the fishing line is taken up, the screw is likely to get loosened, resulting in the jolting of the handle.

U.S. Pat. No. 4,310,127 issued to the assignee of the inventor of this invention discloses a spinning reel having a handle arm pivotally mounted on a handle shaft, and a slide button having an inner end connected to a wedge-shaped slide key, the slide button being slidable along the length of the handle arm and urged by a spring into locking engagement with a space between the end of the handle shaft and the handle arm. According to this arrangement, the handle arm can easily and quickly be raised into its operative position or retracted into its folded position, and can reliably be held in its raised position.

The spinning reel disclosed in U.S. Pat. No. 4,310,127, however, still has disadvantages. The handle arm lies in parallel to the handle shaft when it is folded. This requires the handle shaft to be sufficiently long to enable the storage of the handle arm. Therefore, the handle shaft has a considerably great length. There is a limitation to the possibility of shortening the handle knob. When the handle arm is folded, the handle shaft and the handle arm connected thereto project laterally from one side of the reel body by a large distance. This distance of projection cannot be shortened in the conventional spinning reel.

SUMMARY OF THE INVENTION

It is an object of this invention to provide a handle for a fishing spinning reel which can easily and quickly be raised or retracted, and can reliably be held in its raised position, and which has a shortened handle shaft which contributes to a reduction in the weight of the handle and the compact construction of the reel as a whole when it is not in use.

According to this invention, the handle arm is foldable into a position which is perpendicular to the handle shaft, as will hereinafter be described in detail with reference to the accompanying drawings.

BRIEF DESCRIPTION OF THE DRAWINGS

FIG. 1 is a front elevational view, partly in section, of a handle for a fishing spinning reel embodying this invention, in which the handle is shown in its raised position;

FIG. 2 is a side elevational view of the handle shown in FIG. 1;

DETAILED DESCRIPTION OF THE INVENTION

Figure 4:
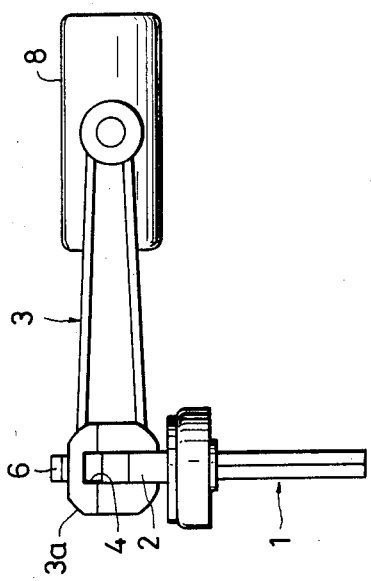
FIG. 4 is a side elevational view of the handle shown in FIG. 3.

A handle for a fishing spinning reel embodying this invention has a handle shaft 1 supported on a reel body not shown, and connected to a master gear not shown, either. The handle shaft 1 has an axial projection 2 having a longitudinal axis disposed eccentrically relative to that of the handle shaft 1. A handle arm 3 is provided at its lower end 3a with a transversely extending channel-shaped groove 4 in which the projection 2 is received. The handle arm 3 is rotatably connected to the projection 2 by a pivot pin 5 so that it may be retracted into its folded position in which it is perpendicular to the handle shaft 1.

The lower end or base 3a of the handle arm 3 is provided with a recess 3b which is connected with the groove 4. A slider 6 is received in the recess 3b, and slidable along the handle shaft 1 when the handle arm 3 is raised, and in a direction perpendicular to the handle shaft 1 when the handle arm 3 is retracted. A spring 7 is also provided in the recess 3b to urge the slider 6 into locking engagement with one side 2a of the projection 2.

Figure 3:
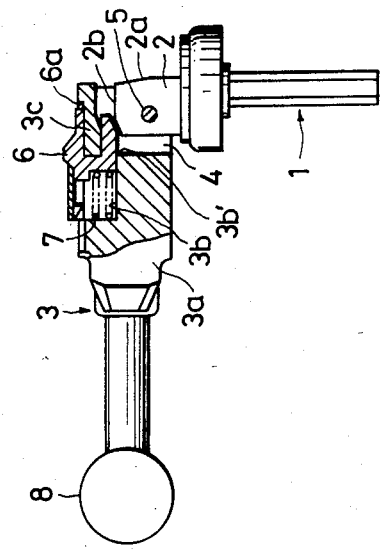
FIG. 3 is a front elevational view, partly in section, of the handle in its folded position.

The groove 4 has an opening in which the projection 2 of the handle shaft 1 is received. The handle arm 3 is pivotally connected to the projection 2 so that when the handle arm 3 in the shape of a half crank is raised, its base 3a may be coaxial with the handle shaft 1, as shown in FIGS. 1 and 2. The recess 3b has an opening 3b' through which it is connected with the bottom of the groove 4. The compression spring 7 is disposed between the rear wall of the recess 3b and the rear end of the slider 6. When the handle arm 3 is raised, the spring 7 pushes out the front end 6a of the slider 6 through the opening 3b' so that the front end 6a may engage one side 2a of the projection 2 to hold the handle arm 3 in its raised position, as shown in FIG. 1. When the handle arm 3 is folded, the front end 6a of the slider 6 is disengaged from the projection 2, as shown in FIG. 3. The side 2a of the projection 2 and the front end 6a of the slider 6 have each a beveled surface so that they may be able to engage each other resiliently without jolting.

The front end of the slider 6 is provided with a channel-shaped concavity 6b in which a sidewall 3c corresponding to the bottom wall of the groove 4 in the handle arm 3 is received slidably. The sidewall 3c prevents any lateral movement of the slider 6, and thereby ensures the engagement of its front end 6a with the side 2a of the projection 2.

In order to lay the handle arm 3, the slider 6 is retracted against the action of the spring 7, and when the handle arm 3 has been laid into its folded position, the force applied to the slider 6 is removed, whereupon the slider 6 is pushed forward by the spring 7, and its front end 6a is held in disengagement from the projection 2. When the handle arm 3 is raised, the front end 6a of the slider 6 is engaged with the upper end 2b of the projection 2, and the slider 6 retracts against the action of the spring 7. When the handle arm 3 has been brought to its fully raised position, the front end 6a of the slider 6 leaves the upper end 2b of the projection 2, and moves forward into engagement with the side 2a of the projection 2 as shown in FIG. 1. The front end 6a of the slider 6 is held in engagement with the upper end 2b of the projection 2 when the handle arm 3 is in its folded position, as shown in FIG. 3.

When the handle bar 3 is in its raised position, the spring 7 holds the slider 6 in engagement with the projection 2. The handle arm 3 is, therefore, reliably held in its raised position without any jolting when the spinning reel is in use. A handle knob is shown at 8.

According to the handle assembly of this invention as hereinabove described, the handle arm can easily and quickly be retracted into its folded position only if the slider is moved against the action of the spring by the very hand holding the handle arm. The handle assembly can be brought into its operative position only if the handle arm is raised, whereupon the slider moves automatically into locking engagement with the projection. There is no jolting between the handle arm and the handle shaft, but the handle assembly is reliably held in its operative position.

The handle assembly of this invention is not only convenient for the takeup of the fishing line, and the storage and transportation of the reel, but also the handle bar can, when not in use, be kept in a position perpendicular to the handle shaft, i.e., in parallel to the reel body. Accordingly, the handle shaft does not substantially project laterally from the reel body, but the reel as a whole is very compact in construction. The shortened handle shaft contributes to a reduction in weight of the handle assembly.

What is claimed is:

1. A handle for a spinning reel for fishing including a handle shaft, and a handle arm connected to said handle shaft, comprising: said handle shaft having a substantially rectangular shaped end projection, said end projection having a first surface extending substantially in parallel with axial direction of said handle shaft, and a second surface extending substantially perpendicular thereto; said handle arm provided with a channel-shaped groove in which said end projection is received, means for pivotally connecting said handle arm to said end projection, and rotatable between a first position in which it is coaxial with said handle shaft and a second position in which it is perpendicular to said handle shaft, said handle arm being also provided with a recess contiguous to said groove; a slider in said recess, said slider having a beveled front end surface engageable with one of said first surface and said second surface of said end projection; and a spring disposed in said recess for urging said slider into locking engagement with one of said first and second surfaces when said handle arm is in said one of first and second positions, said first position being maintained by surface contact between said beveled front end surface of said slider and said first surface of said end projection, while said second position being maintained by surface contact between said beveled front end surface and said second surface of said end projection, and positional switching being made by manually urging said slider against biasing force of said spring.

2. A handle assembly as set forth in claim 1, wherein said handle arm has a wall engaged with said slider to prevent any lateral movement of said slider away from said handle arm and said handle shaft.

* * * * *